United States Patent [19]
Rossi

[11] Patent Number: 5,428,202
[45] Date of Patent: * Jun. 27, 1995

[54] METHODS AND APPARATUS FOR FUSING ELECTRICAL CONDUCTORS

[75] Inventor: Alessandro Rossi, Florence, Italy

[73] Assignee: Axis USA, Inc., Tampa, Fla.

[*] Notice: The portion of the term of this patent subsequent to Apr. 5, 2011 has been disclaimed.

[21] Appl. No.: 177,151

[22] Filed: Jan. 4, 1994

Related U.S. Application Data

[63] Continuation of Ser. No. 903,910, Jun. 25, 1992, Pat. No. 5,300,753.

[51] Int. Cl.6 .............................................. B23K 11/24
[52] U.S. Cl. ................................. 219/110; 219/86.51; 219/87; 219/91.1; 219/91.21
[58] Field of Search ............... 219/110, 86.51, 56.1, 219/56.21, 56.22, 87, 91.1, 91.21

[56] References Cited

U.S. PATENT DOCUMENTS

| | | | |
|---|---|---|---|
| 3,727,822 | 4/1973 | Umbaugh | 228/1 |
| 4,001,539 | 1/1977 | Franchi et al. | 219/110 |
| 4,734,556 | 3/1988 | Namiki | 219/110 |
| 4,876,431 | 10/1989 | Livingston | 219/110 |
| 4,973,815 | 11/1990 | Ito et al. | 219/110 |
| 5,063,279 | 11/1991 | Rossi | 219/86.51 |
| 5,072,090 | 12/1991 | Morita | 219/108 |
| 5,138,127 | 8/1992 | Fries et al. | 219/86.51 |
| 5,300,753 | 4/1994 | Rossi | 219/110 |

FOREIGN PATENT DOCUMENTS

| | | |
|---|---|---|
| 0185629 | 6/1986 | European Pat. Off. . |
| 4113117 | 5/1992 | Germany . |
| 1228677 | 9/1989 | Japan . |

OTHER PUBLICATIONS

Warner, A., "Up and Down Slope Control," *Joyal Products Technical Brochure* (1975).
Black & Webster, "Small Parts Resistance Welding," brochure (1990).
Joyal Produts, Inc., "Model 92-TT 'Tang Top' Commutator Fusing Machine," brochure (1991).
Modern Machine Development Corporation, "New Advancements in Commutator Fusing," brochure (1991).
Modern Machine Development Corporation, "Model AHSM-100 M," brochure (1991).

*Primary Examiner*—Clifford C. Shaw
*Attorney, Agent, or Firm*—Fish & Neave; Robert R. Jackson; Robert W. Morris

[57] ABSTRACT

Methods and apparatus for fusing together electrical conductors to a commutator are provided. A precise, timed, and controlled delivery of electric current to the fusing electrode of the fusing machine is achieved. A generic supply signal is converted into a precise and constant input signal through the use of monitoring and feedback techniques, which compare the current status of the physical and electrical phases of the fusing operation to various predetermined fusing profiles to determine the proper application of current to the fusing electrode.

13 Claims, 5 Drawing Sheets

METHODS AND APPARATUS FOR FUSING ELECTRICAL CONDUCTORS

CROSS REFERENCE TO RELATED APPLICATION

This application is a continuation of U.S. patent application Ser. No. 07/903,910, filed Jun. 25, 1992, now U.S. Pat. No. 5,300,753.

BACKGROUND OF THE INVENTION

This invention relates to fusing machines, and more particularly, to machines for fusing the armature wires of an electric motor, and the application and control of electric current to generate heat during the fusing operations.

Fusing machines are widely used for fusing armature wires to commutators, and stator wires to terminal boards, of electric motors. Commutators typically have tangs or slots to which the wires are attached. Terminal boards typically have contact hooks for wire attachment. A typical armature fusing operation involves applying a physical force from the fusing electrode to the tang or slot being fused. Next, current is applied to the fusing electrode, which passes through the commutator to a ground electrode. The resistance of the fusing electrode is higher than that of the commutator, causing the fusing electrode to heat. The heat is thermally transferred to the point of contact between the fusing electrode and the commutator. Additional physical force may be used, as well as additional applications of current, to complete the fusing operation. A similar set of steps is required for stator fusing operations.

Precise control of the physical and electrical phases of the fusing operation has been difficult to achieve. U.S. Pat. No. 5,063,279 describes a fusing machine having precise control of the physical phases of the fusing operation. The application of force from the fusing electrode to the commutator bar (or terminal board) and wires is performed according to predetermined force or displacement functions. This provides a fusing machine that continuously monitors electrode force or displacement and provides rapid feedback for maintaining a precise application of force throughout the fusing operation.

Precise control of the electrical phases of fusing operations has yet to be achieved. The lack of precise control of the application of current during fusing can cause unintentional significant heating to occur (such as throughout the commutator bar). The production of modern commutator cores includes materials that are more sensitive to heat than previous materials (e.g., asbestos). The structural characteristics of these modern cores may be altered by uncontrolled significant heating, thereby causing impairment of the core materials ability to anchor the commutator bars. This might result in, for example, the commutator bars coming loose from centrifugal force during normal operation of the motor. Similar disadvantages exist with stator terminal boards due to the use of extremely variable metal alloys in terminal board construction.

The quality of the fused joint is also affected by the level of precision used in the application of current during fusing. The heat generated by the fusing electrode provides two main purposes. First, the applied heat causes a plastic deformation to occur to the parts being fused without their temperature reaching a molten state (unlike welding). Second, the applied heat is used to vaporize the insulation of the wire being connected to the commutator (or terminal board). This vaporization is critical to the efficient production of motor windings. When sufficient heat is not generated in a precise manner, there is not consistent and complete removal of insulation from the wire. Additionally, the imprecise application of heat during tang fusing can result in unreliable cohesion joints between the commutator and the wire.

In an effort to try to achieve high quality fusing, time consuming and complex operations must be undertaken to set up the fusing machine. Such operations could be avoided if a fusing machine could precisely apply various levels of current at the proper time throughout the fusing operation. Additionally, a more precise delivery of heat during fusing would result in an overall reduction in heat required and a saving of energy consumed during the overall fusing operation.

Conventional systems exist which supply current in the form of impulses which are derived from a normal sinusoidal alternating current (AC) supply line. One such invention is described in U.S. Pat. No. 4,001,539, which describes a control system that supplies electric current to welding electrodes. This system is based on supplying a series of current pulses, which represent slices of the sinusoidal input signal, as a series of output pulses. Current amplitude is varied by affecting a phase shift as to when, and for how long, the output pulses are supplied to the welding electrode.

Current delivery by pulsing requires that relatively long pauses occur between the delivery of each output pulse while waiting for the input signal to reach the desired amplitude or phase again. The long pauses are impractical when attempting to achieve precise control of the delivery of current during fusing operations. Further, the long pauses prevent synchronization between complex physical phase profiles and electrical supply profiles because typical regulating supplies can not keep pace with the rapid changes in current requirements. In addition, the long pauses require that the applied current be delivered at higher levels than would be necessary if the current were applied continuously in order to achieve proper heating. The higher current causes accelerated deterioration of the electrode (cratering, where holes form in the electrode surface), thereby reducing the life of the electrode.

It would therefore be desirable to provide a fusing machine which applies electric current in a manner which is consistent with the time of any variation during fusing operations. It would also be desirable to provide a fusing machine which limits significant heating to only the parts which form the fused joint. It would also be desirable to provide a fusing machine which provides consistent and complete removal of wire insulation, and in the case of tang fusing, a more reliable cohesion joint. It would also be desirable to provide a fusing machine which does not require complex and time consuming set-up operations to achieve high quality fusing. It would also be desirable to provide a fusing machine that requires less heating and energy to perform fusing operations. It would also be desirable to provide a fusing machine which provides current delivery in such manner that reduces electrode deterioration.

SUMMARY OF THE INVENTION

In view of the foregoing, it is an object of this invention to provide an improved fusing machine that applies electric current to fusing electrodes in a manner which is consistent with the time of any variation during fusing operations.

It is a further object of this invention to provide an improved fusing machine which limits significant heating to only the parts which form the fused joint.

It is another object of this invention to provide an improved fusing machine which produces more complete and consistent removal of wire insulation during fusing operations.

It is still a further object of this invention to provide an improved fusing machine which produces more reliable cohesion joints during tang fusing operations.

It is still another object of this invention to provide an improved fusing machine which does not require complex and time consuming set-up operations in order to achieve high quality fusing.

It is another object of this invention to provide an improved fusing machine which requires less heating and less energy to perform fusing operations.

It is another object of this invention to provide an improved fusing machine which delivers current in such manner that electrode deterioration is reduced.

These and other objects of the invention are accomplished in accordance with the principles of the invention by providing an improved fusing machine having regulation and control circuitry which produces a precise supply of electric current to fusing electrodes during fusing operations. The control circuitry utilizes monitoring and feedback principles to control the generation of an input signal to the fusing electrode. The monitored signals are compared to predetermined values which correspond to different phases of fusing operations in order to generate adjustment signals.

The fusing machine includes the capability to provide current, voltage, power, or energy regulation by using feedback sensors which measure the current and voltage being utilized by the fusing electrode. These feedback signals are compared to predetermined reference signals to provide error correction signals to the input signal generation circuitry. The predetermined reference signals are related to the method being used to control the physical operation of the fusing electrode (force performance or programmed displacement). Other feedback signals are provided by a load cell and a displacement transducer to show the current status of the physical phase of the fusing operation.

The fusing machine further includes control circuitry which stores various operational profiles to accommodate the various phases of many different fusing operations. Such fusing operations are often characterized by extremely short timings and different heating requirements which require a more precise delivery of electric supply. The control circuitry receives inputs from the end-user, electrical feedback signals, and physical feedback signals and compares the inputs to stored profiles to establish the proper adjustments required to achieve precise current delivery to the fusing electrode.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
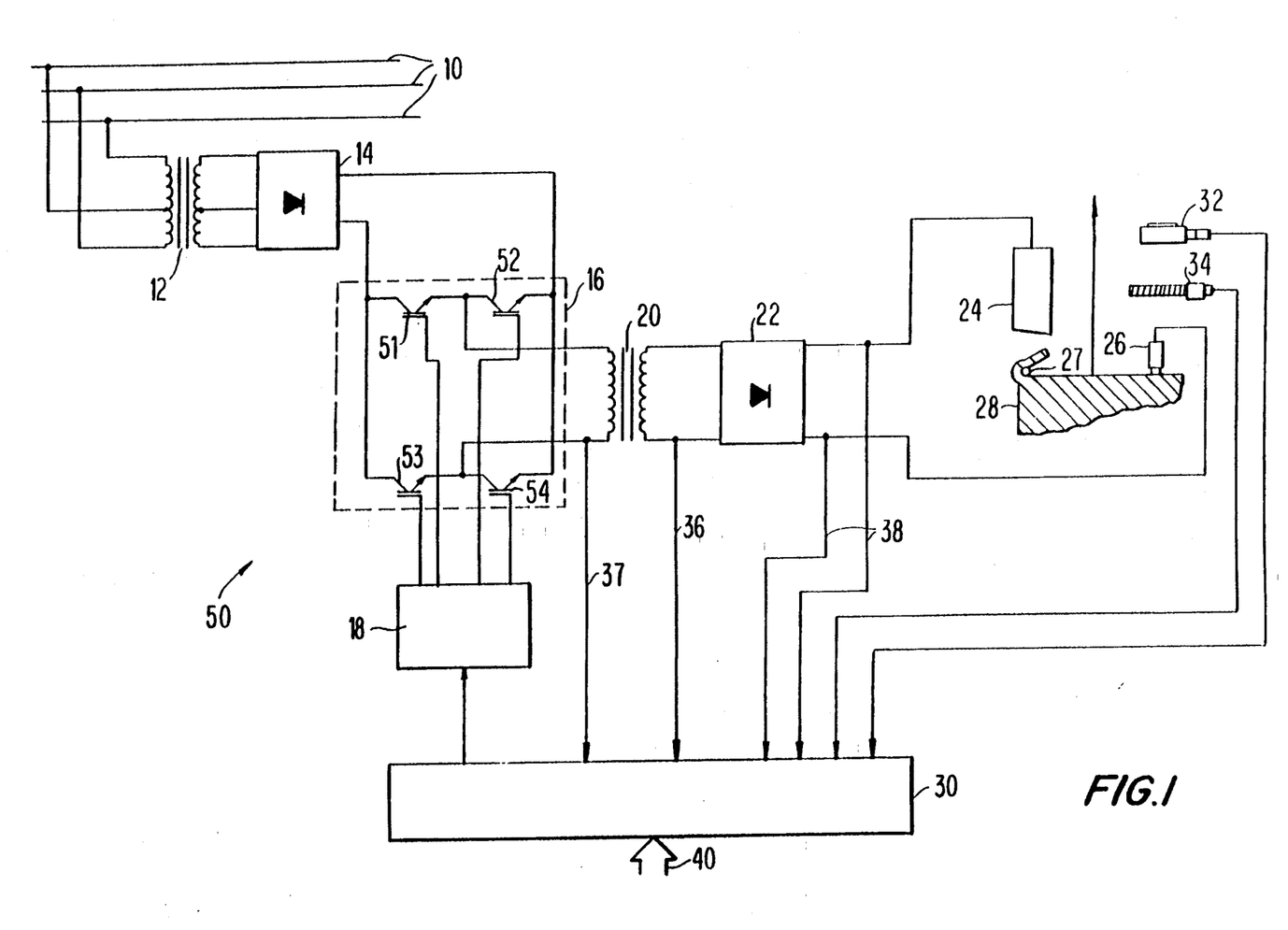
FIG. 1 is a schematic block diagram of an embodiment of the present invention.
Figure 2:
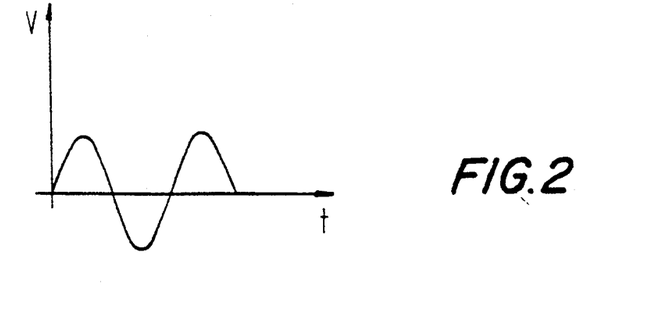
FIG. 2 is a graph displaying voltage versus time of one phase of a sample three phase supply signal.
Figure 3:
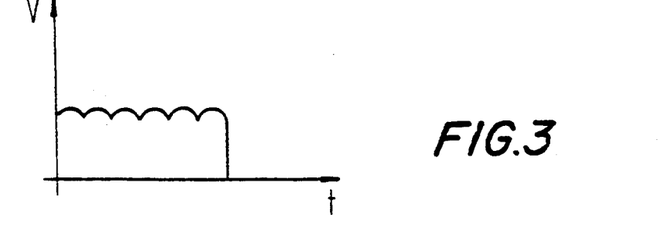
FIG. 3 is a graph displaying the same signal as FIG. 2 after it has passed through a full wave rectifying circuit.

FIG. 1 shows a schematic block diagram of regulation circuit 50 of the present invention. In FIG. 1, regulation circuit 50 is used to fuse wire 27 to commutator bar 28. Three-phase AC supply line 10 supplies a generic AC signal (50–60 Hz), a single-phase of which is shown in FIG. 2, to transformer 12. Transformer 12 lowers the voltage of the input signal before passing the signal to full-wave rectifying bridge 14. Rectifying bridge 14 provides a rectified signal which is relatively stable and has low ripple, as shown in FIG. 3. This rectified signal is fed to single-phase inverter bridge 16, which comprises NPN-transistors 51, 52, 53, and 54. Inverter bridge 16 may be comprised of other types of transistors (e.g, PNP transistors) without affecting the scope of the invention. The essential principle is that a minimum of two pairs of transistors are configured into an H-structure between the two supply lines. An output line from bridge 16 is connected to the center of each pair of transistors, as described below. By alternatively triggering each pair of transistors on and off, a full-wave rectangular square wave signal is generated across the output lines.

In one embodiment of the invention, NPN-transistors 51, 52, 53, and 54 of inverter bridge 16 are configured in pairs with transistors 51 and 52 comprising a first pair and transistors 53 and 54 comprising a second pair. Each of transistors 51–54 has a base, which is connected to driver 18, a collector and an emitter. The collectors of transistors 51 and 53 are connected in parallel to one of the outputs of rectifying bridge 14, and to each other. The emitters of transistors 52 and 54 are connected in parallel to the other output of rectifying bridge 14, and to each other. The connection of the emitter of transistor 51 and the collector of transistor 52 forms a node which is also connected to one of the outputs of inverter bridge 16. A similar connection is made by the emitter of transistor 53 and the collector of transistor 54 to form the other output of inverter bridge 16.

Figure 4:
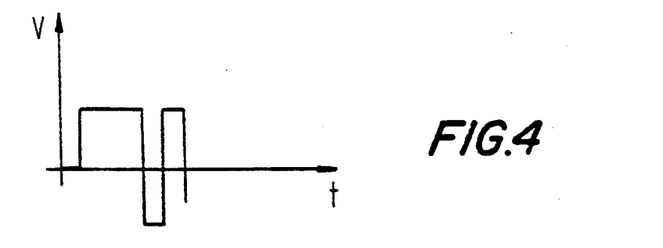
FIG. 4 is a graph displaying a sample pulse width modulated (PWM) rectangular wave form signal which is used as a control signal as part of this invention.
Figure 5:
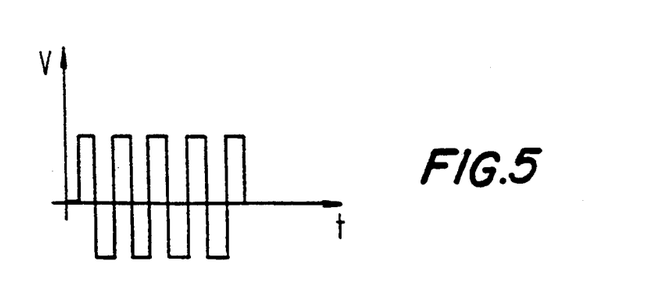
FIG. 5 is a graph displaying a sample rectangular wave form signal which represents the processed signal of FIG. 3 in accordance with the principles of this invention.
Figure 6:
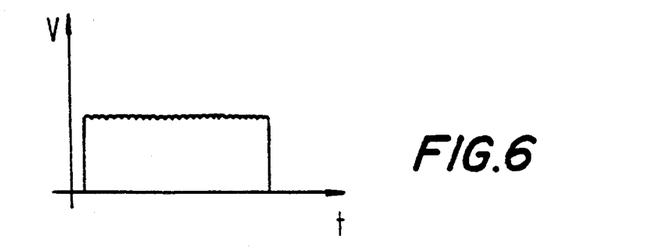
FIG. 6 is a graph displaying a sample output signal of this invention which is supplied to the fusing electrode.

The triggering of transistors 51-54 (turning them on and off) is controlled by a pulse width modulated (PWM) rectangular wave form signal supplied to the base of each transistor by driver 18. An effective frequency of such triggering is typically about 2 KHZ, which enables the regulation circuit to be synchronized with the changing phases of the fusing electrode movement control system. A typical trigger signal is shown in FIG. 4. The trigger signals are supplied to transistors 51-54 in such a manner that each pair of transistors is alternatively switched on and off, thereby generating a full-wave rectangular square wave form signal. The outputs of inverter bridge 16 are connected across the input of transformer 20 so that the output of transformer 20 will be an alternating current rectangular square wave form signal, a sample of which is shown in FIG. 5. The amplitude of the square wave form signal can be changed by varying the triggering signals of driver 18.

The rectangular square wave form of transformer 20 is passed through single-phase full-wave rectifying bridge 22 to produce the final output signal. The output signal is transmitted through fusing electrode 24 and commutator bar 28, and returns through grounding electrode 26. The impedance of transformer 20 and other filtering devices (not shown) guarantee that this non-oscillating signal has virtually no ripple, making it similar to applying direct voltage across the electrodes. This provides a stable, controllable, precise signal which has the advantages of a direct voltage supply.

Regulation circuit 50 can be operated in several different modes including: current, voltage, power, or energy regulation. The different modes are accomplished through the use of current feedback lines 36 and 37, and voltage feedback lines 38. Line 36 measures the instantaneous current load of fusing electrode 24 at the secondary of transformer 20, while line 37 measures current load at the primary of transformer 20. Lines 38 measure the voltage across fusing electrode 24. The feedback signals are compared to predetermined reference signals by controller 30 to establish current and voltage error signals. The error signals are very precise because the current on each side of transformer 20 is known, which enables controller 30 to monitor the saturation effect of transformer 20 and adjust the error signals accordingly. Controller 30 converts the error signals into command signals which are passed to driver 18. Driver 18 adjusts the triggering signals supplied to transistors 51-54 to cause rapid and accurate system response to variations in fusing operations.

The predetermined reference signals are related to the specific displacement or force application profile that is currently being used to control the movement of fusing electrode 24. Controller 30 synchronizes the fusing electrode movement commands with the regulation supply commands according to predefined profiles. These commands are based on feedback inputs received from load cell 32, which monitors the force performance of fusing electrode 24, or transducer 34, which monitors the displacement of electrode 24. Based on these feedback inputs, or user-inputs received from line 40, controller 30 commands the regulating supply to change from one reference signal to another, as well as commanding the current supply to turn on and off.

Figure 7:
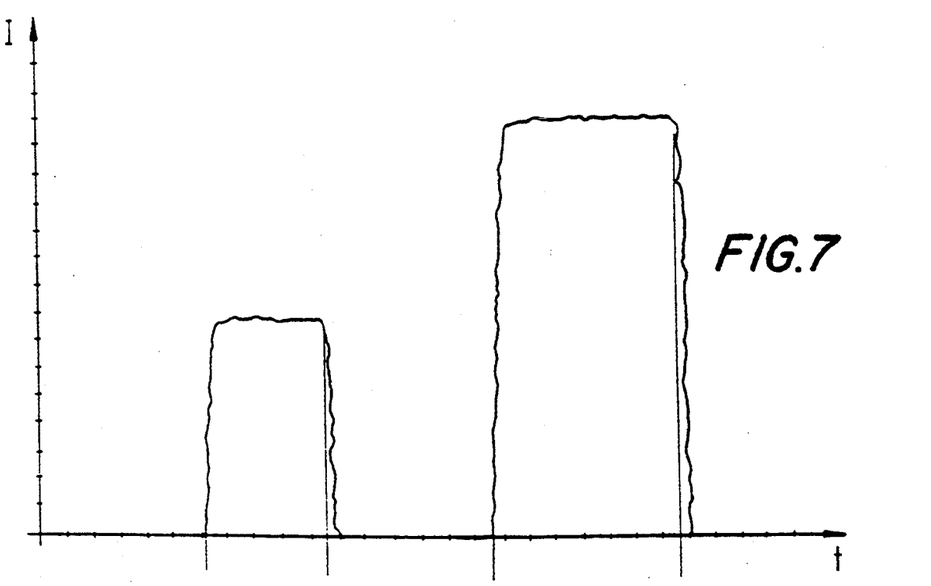
FIG. 7 is a graph displaying the required application of current versus time for a sample tang fusing operation in accordance with the principles of this invention.
Figure 8:
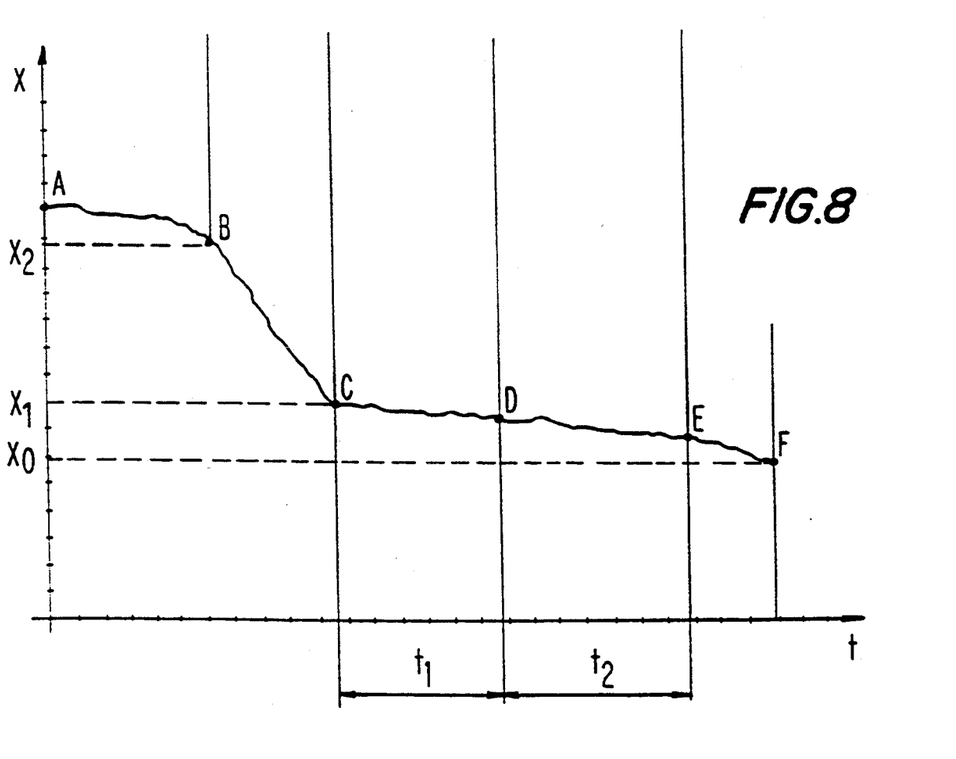
FIG. 8 is a graph displaying a displacement profile of displacement versus time for the sample tang fusing operation of FIG. 7. (The time base for FIGS. 7 and 8 is the same).
Figure 9:
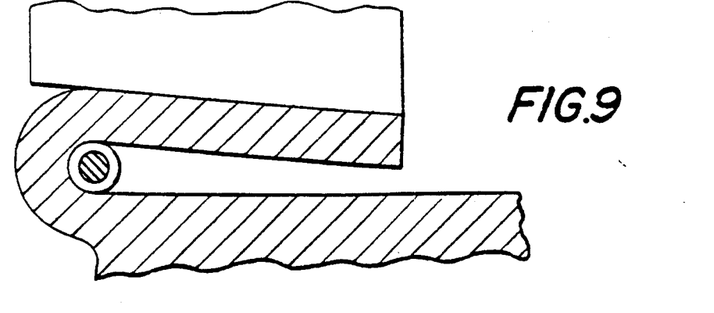
FIGS. 9-11 are partial elevational views of an electrode fusing a commutator tang and armature wire to a commutator bar.

FIGS. 7 and 8 display current and displacement profiles for part of a typical fusing operation. FIG. 7 is a graph of current (I) versus time (t) which shows part of a fusing cycle requiring two separate applications of current, each at a different amplitude, to the fusing electrode. FIG. 8 is a graph of displacement (X) versus time (t) for the same fusing cycle as FIG. 7, divided into five different phases. In phase A-B, closed loop displacement control is used to advance the fusing electrode according to predetermined speeds to contact and deform the commutator tang. As this invention is primarily concerned with the delivery of current during fusing, phase A-B represents only the final portion of the initial deforming phase. The phase ends when displacement X2 is monitored, which represents the point of maximum surface contact between the electrode and the commutator (as shown in FIG. 9).

Figure 10:
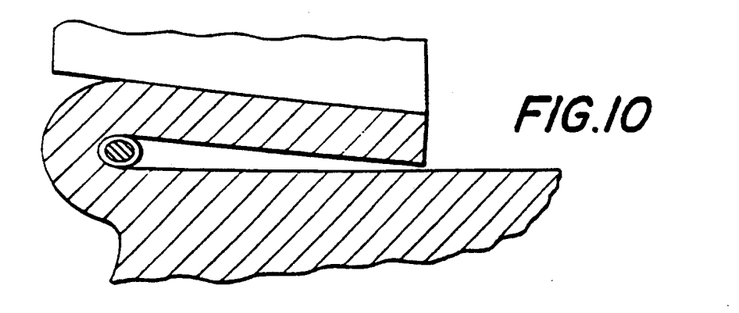

After maximum surface contact has been achieved, electrode movement is controlled according to predetermined profiles using closed loop force control. During phase B-C, a first level of current is supplied to the fusing electrode and deforming continues until displacement point X1 is reached and the current supply is turned off. An illustration of this state is given in FIG. 10. Also during this phase, the controller compares the displacement with predetermined profiles in order to adjust the remaining phases, and forces to be applied, to achieve the highest quality fused joint.

Figure 11:
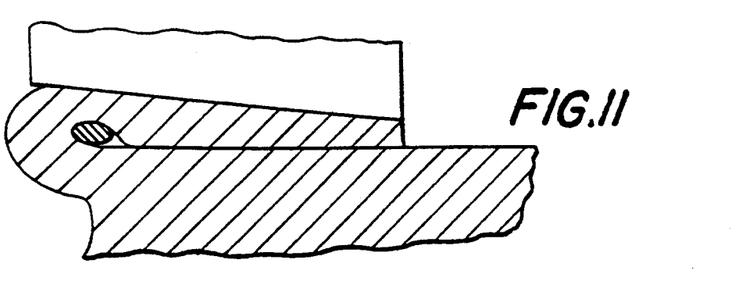

Phase C-D is a rest phase which lasts for time t1, where neither current, nor force is applied to the commutator bar. During phase D-E, a higher level of current is supplied and force is re-applied in order to complete vaporization of the wire insulation and form a high quality fused joint. At time t2, the current supply is turned off, but force continues to be applied, until displacement X0 is reached. As shown in the illustration in FIG. 11, plastic deformation of the components is complete, without having had to reach a molten state, and the wire insulation is, essentially, completely vaporized. The fusing electrode is then removed and the cycle begins for another fusing operation.

Figure 12:
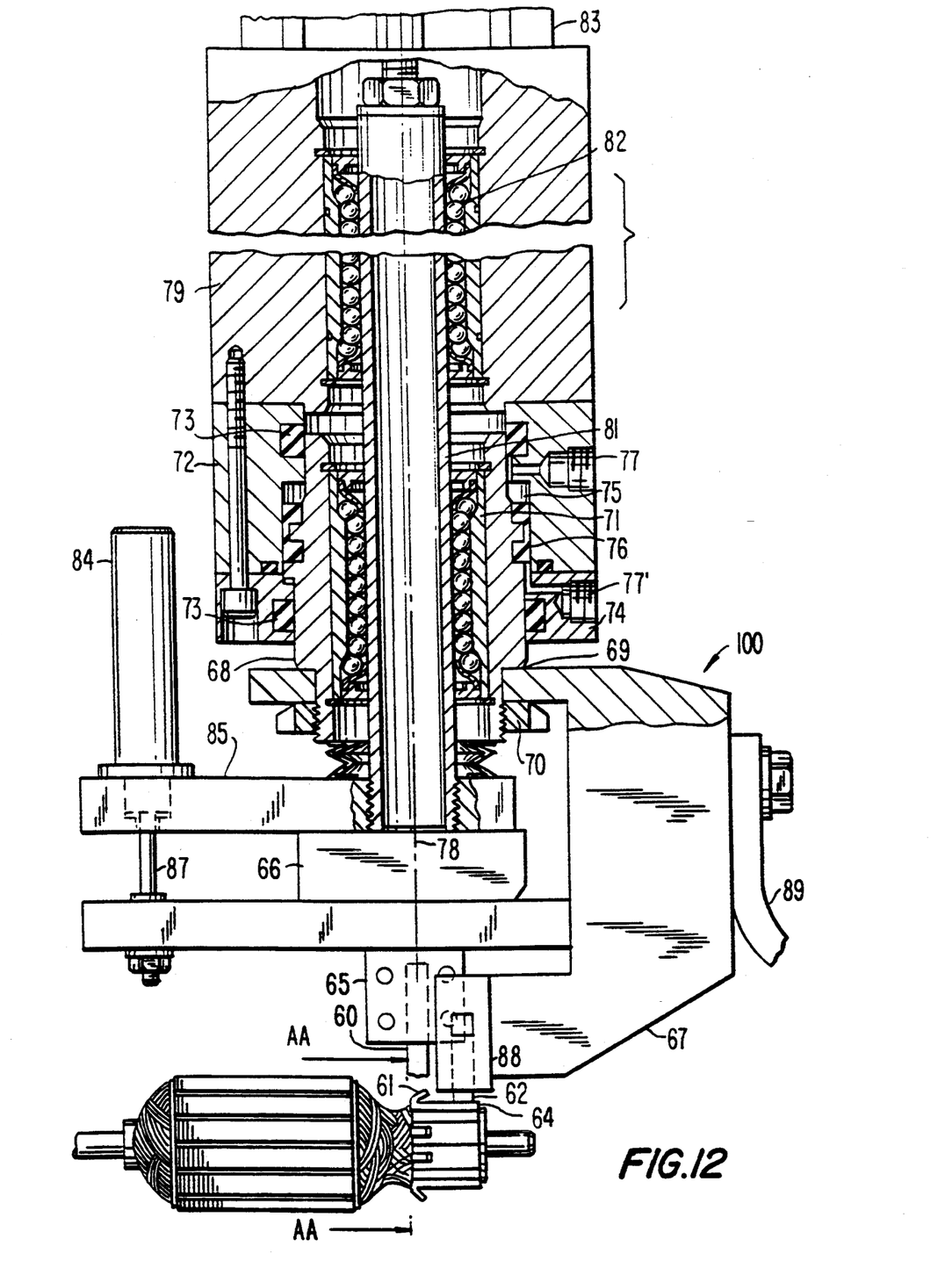
FIG. 12 is a cross-sectional view of an illustrative embodiment of a fusing machine constructed in accordance with the principles of this invention.

FIG. 12 shows a cross-sectional view of ah illustrative embodiment of fusing machine 100 constructed in accordance with the principles of this invention. Fusing electrode 60 contacts and deforms tang 61 while ground electrode 62 maintains firm contact with commutator bar 64.

Fusing electrode 60 is rigidly connected to support member 65 which is releasably connected to cooling block 66. Ground electrode 62 is rigidly connected to support member 88 which is releasably connected to structure member 67 (which further operates as a cooling block). Current passage braid 89 is fixedly connected to member 67 to provide a safety ground path for machine 100. A similar braid (not shown) is fixedly connected to cooling block 66. Structure member 67 is rigidly mounted against shoulder 69 of piston member 68 by means of threaded ring 70. Recirculating guide member 71 is rigidly mounted inside piston member 68 to enable piston member 68 to slide on hollow shaft 81. Keys (not shown) are provided to prevent piston member 68 from rotating about hollow shaft 81.

Cylinder member 72 is provided with seals 73 and lid 74 for forming air compartments 75 and 76. Bores 77 and 77' allow pressurized air to be supplied to compartments 75 and 76 so that piston member 68, and therefore ground electrode 62, can be translated along axis 78 to contact commutator bar 64. Cylinder member 72 is flanged to the distal end of carriage 79, which is connected to a frame structure (not shown) by means (not shown). Hollow shaft 81 is supported on guide 82 having recirculating balls and mounted in carriage 79. Linear actuator 83 is flanged to the proximal end of carriage 79, which is connected to the proximal end of hollow shaft 81 for translating hollow shaft 81 along axis 78. The distal end of hollow shaft 81 carries support plate 85, which is rigidly connected to cooling block 66. Linear potentiometer 84, having movable shaft 87, is removably connected to support plate 85. Movable shaft 87 is removably connected to an extension of support structure 67.

Figure 13:
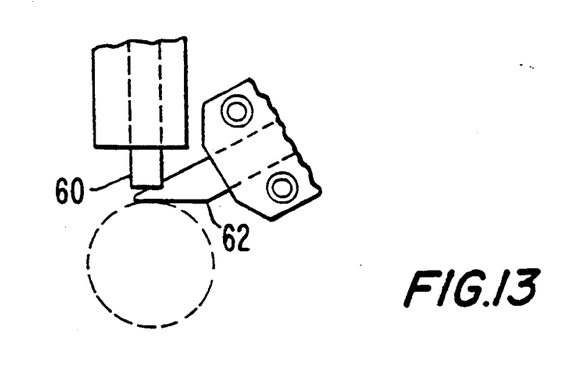
FIG. 13 is a partial, cross-sectional view taken along line AA—AA of the commutator bar, fusing electrode, and grounding electrode.

A sample operation of this fusing assembly is now described. Carriage 79 is translated by means not shown to place electrodes 60 and 62 in their rest position for a required commutator size. Cylinder compartment 75 is then pressurized to cause piston member 68, and therefore ground electrode 62, to translate parallel to axis 78 in order to make contact with commutator 64. This causes linear potentiometer shaft 87 to extend until contact with the bar is reached (this position is shown in FIG. 13). Readings from linear potentiometer 84 can be used by controller 30 to identify the exact position of commutator bar 64 with respect to an absolute reference. In moving along axis 78, ground electrode 62 is guided by means of ball recirculating guide 71 mounted on hollow shaft 81, as previously described. Fusing electrode 60 can then be advanced by activating linear actuator 83 through conventional devices for regulating the fusing force and displacement to be reached in accordance with a predetermined performance profile. By operating in this manner, the deformation required during the fusing operation can be precisely referenced to the commutator bar having the tang to be fused. These precise references are used by this invention to supply a synchronized, rapidly responsive, supply of current to the fusing electrode.

It will be understood that the foregoing is merely illustrative of the principles of this invention, and that various modifications can be made by those skilled in the art without departing from the scope and spirit of the invention. For example, the entire fusing operation described above can be accomplished using a terminal board instead of a commutator bar. The physical force and electric current would be applied to the terminal board hook instead of the commutator tang to form the fused joint.

The invention claimed is:

1. Apparatus for fusing at least one armature wire and at least one piece of commutator material together, said apparatus comprising:
   a fusing member for applying force and heat to soften said commutator material and to deform said commutator material around said armature wire;
   a grounding member;
   means for moving said fusing member relative to said armature wire and said commutator material in order to cause said fusing member to contact and apply force to said commutator material thereby deforming said commutator material intimately around said armature wire;
   means for generating an essentially non-oscillating current through said armature wire and said commutator material from said fusing member to said grounding member to heat said fusing member so that said commutator material is softened and so that said heat vaporizes insulation on a portion of said armature wire within said softened deformed commutator material; and
   means for controlling the delivery of said non-oscillating current in accordance with a predetermined electrical delivery function.

2. The apparatus of claim 1, wherein said means for generating comprises:
   a source of a first direct current electrical signal;
   means for switching said first direct current electrical signal alternatively on and off to produce a second, switched, direct current electrical signal;
   means for controlling said means for switching to vary the length of time that said first direct current electrical signal is switched on in relation to the length of time that said first direct current electrical signal is subsequently switched off; and
   means for integrating said second, switched, direct current electrical signal over time to produce said essentially non-oscillating signal.

3. The apparatus defined in claim 2, wherein said means for controlling comprises:
   a current feedback sensor for measuring a current component of said essentially non-oscillating signal; and
   a comparing circuit for comparing said current component to a first predetermined reference signal, such that said comparing circuit provides error correction input signals to said means for controlling which causes said means for controlling to vary the length of time that said first direct current electrical signal is switched on in relation to the time that said first direct current electrical signal is subsequently switched off.

4. The apparatus defined in claim 2, wherein said means for controlling comprises:
   a voltage feedback sensor for measuring a voltage component of said essentially non-oscillating signal; and
   a comparing circuit for comparing said voltage component to a first predetermined reference signal, such that said comparing circuit provides error correction input signals to said means for controlling which causes said means for controlling to vary the length of time that said first direct current electrical signal is switched on in relation to the time that said first direct current electrical signal is subsequently switched off.

5. The apparatus defined in claim 1, wherein said means for generating comprises an inverter and a rectifier.

6. The apparatus defined in claim 5, wherein said inverter comprises at least two transistor pair circuits, each transistor pair circuit being coupled between a first source of a first direct current electrical signal and said rectifier.

7. The apparatus defined in claim 6, wherein each of said transistor pair circuits comprises:
   a pair of transistors, which provide a rectangular half-wave form signal, comprising first and second transistors, each transistor having a base uniquely coupled to a means for controlling said inverter, a collector, and an emitter, said collector of said first transistor being coupled to said source of a first direct current electrical signal, said collector of said second transistor being coupled to said emitter of said first transistor and to said rectifier, and said emitter of said second transistor being coupled to said source of a first direct current electrical signal.

8. The apparatus defined in claim 5, wherein said means for generating further comprises a transformer coupled in series between said inverter and said rectifier.

9. The method of using a fusing member to fuse together at least one armature wire and at least one piece of commutator material, the method comprising the steps of:

moving said fusing member relative to said armature wire and said commutator material in order to cause said fusing member to contact and apply force to said commutator material thereby deforming said commutator material intimately around said armature wire;

generating an essentially non-oscillating current through said armature wire and said commutator material from said fusing member to a grounding member to heat said fusing member so that said commutator material is softened and so that said heat vaporizes insulation on a portion of said armature wire within said softened deformed commutator material; and     precisely controlling the delivery of said non-oscillating current in accordance with a predetermined electrical delivery function.

10. The method defined in claim 9, wherein said step of generating comprises the steps of:

applying a first direct current electrical signal;

switching said first direct current electrical signal alternatively on and off to produce a second, switched, direct current electrical signal;

controlling said step of switching to vary the length of time that said first direct current electrical signal is switched on in relation to the length of time that said first direct current electrical signal is subsequently switched off; and     integrating said second, switched, direct current electrical signal over time to produce said essentially non-oscillating signal.

11. The method defined in claim 10, wherein said step of controlling comprises the steps of:

receiving a feedback signal from a feedback sensor; and comparing said feedback signal to a predetermined reference signal to provide error correction input signals which are used in varying the length of time that said first direct current electrical signal is switched on in relation to the length of time that said first direct current electrical signal is subsequently switched off.

12. The method defined in claim 11, wherein said feedback sensor provides a current feedback signal and said predetermined reference signal is a current signal.

13. The method defined in claim 11, wherein said feedback sensor provides a voltage feedback signal and said predetermined reference signal is a voltage signal.

* * * * *